United States Patent
Lee et al.

(10) Patent No.: US 12,412,167 B2
(45) Date of Patent: Sep. 9, 2025

(54) ELECTRONIC TOLL COLLECTION SYSTEM AND CONTROL METHOD FOR THE SAME

(71) Applicants: Hyundai Motor Company, Seoul (KR); Kia Corporation, Seoul (KR)

(72) Inventors: Seung Jae Lee, Gwangmyeong-si (KR); Dongchan Shin, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 76 days.

(21) Appl. No.: 18/354,832

(22) Filed: Jul. 19, 2023

(65) Prior Publication Data
US 2024/0193579 A1    Jun. 13, 2024

(30) Foreign Application Priority Data
Dec. 10, 2022   (KR) .................. 10-2022-0172108

(51) Int. Cl.
*G06Q 20/34*    (2012.01)
*G06Q 20/36*    (2012.01)
(Continued)

(52) U.S. Cl.
CPC ......... *G06Q 20/341* (2013.01); *G06Q 20/367* (2013.01); *G06Q 20/3825* (2013.01); *G06Q 20/3829* (2013.01); *G06Q 30/04* (2013.01); *G06Q 2220/00* (2013.01); *G06Q 2240/00* (2013.01)

(58) Field of Classification Search
CPC .............. G06Q 20/341; G06Q 20/367; G06Q 20/3825; G06Q 20/3829; G06Q 30/04; G06Q 2220/00; G06Q 2240/00; G06Q 20/145; G06Q 50/40; G06Q 20/227;
(Continued)

(56) References Cited

U.S. PATENT DOCUMENTS 8,083,140 B1 * 12/2011 Katzer .................. G06Q 10/10
235/383
8,587,454 B1 * 11/2013 Dearworth ........... G07B 15/063
340/5.1
(Continued)

OTHER PUBLICATIONS

Bo Yan et al., Intelligence Toll Management System of Highway Traffic, Sep. 26, 2008, IEEE, pp. 444-448 (Year: 2008)*

*Primary Examiner* — Nilesh B Khatri
(74) *Attorney, Agent, or Firm* — Slater Matsil, LLP (57) ABSTRACT

An electronic toll collection system terminal includes a communication interface configured to be connected to a vehicle network, a card IC chip configured to store a first card issued, and a controller configured to control the communication interface and the card IC chip. The controller is configured to generate initialization inter-sector electronic purse data of the first card, control the communication interface to transmit the initialization IEP data of the first card to a roadside equipment of the tollgate in response to the vehicle approaching a tollgate in a state where of new issuance of a second card is being requested, and control the communication interface to perform billing communication with the RSE using the first card and, in response to the vehicle passing the tollgate, control the communication interface to switch to the state where of new issuance of the second card is being requested.

20 Claims, 9 Drawing Sheets

(51) Int. Cl.
*G06Q 20/38* (2012.01)
*G06Q 30/04* (2012.01)

(58) Field of Classification Search
CPC .... G07B 15/06; G07B 15/063; G06K 7/0013; G06K 19/07
See application file for complete search history.

(56) References Cited

U.S. PATENT DOCUMENTS

| | | | |
|---|---|---|---|
| 9,595,139 B1* | 3/2017 | Breed | G07B 15/063 |
| 10,769,392 B1* | 9/2020 | Gravelle | H04W 4/027 |
| 2008/0058014 A1* | 3/2008 | Khan | H04L 63/0853 |
| | | | 455/558 |
| 2010/0190437 A1* | 7/2010 | Buhot | H04B 5/00 |
| | | | 455/41.1 |
| 2014/0188579 A1* | 7/2014 | Regan, III | G07B 15/06 |
| | | | 705/13 |
| 2015/0134428 A1* | 5/2015 | Li | G06Q 20/326 |
| | | | 705/13 |
| 2018/0158254 A1* | 6/2018 | Fustes | H04W 4/02 |
| 2022/0051239 A1* | 2/2022 | Bergeron | G06Q 20/409 |
| 2022/0239494 A1* | 7/2022 | Rule | G06F 21/606 |
| 2024/0054820 A1* | 2/2024 | Bernades | G06Q 20/322 |

* cited by examiner

ELECTRONIC TOLL COLLECTION SYSTEM AND CONTROL METHOD FOR THE SAME

CROSS-REFERENCE TO RELATED APPLICATIONS

This application claims the benefit of Korean Patent Application No. 10-2022-0172108, filed on Dec. 10, 2022, which application may be hereby incorporated herein by reference.

TECHNICAL FIELD

The disclosure relates to an electronic toll collection system (ETCS) terminal.

BACKGROUND

An electronic toll collection system (ETCS) such as HI-PASS automatically charges users a toll by using a standardized application interface of the Dedicated Short-Range Communication protocols in order to reduce traffic delays.

That is, the ETCS is a system capable of automatically transmitting and receiving toll information between roadside equipment and a terminal of a vehicle (on-board equipment or ETCS terminal), based on Dedicated Short-Range Communications.

For toll transaction processing, when a vehicle approaches, the ETCS recognizes a class of vehicle by a vehicle classification device and transmits information through a transmission and reception antenna on a lane by linking to a terminal installed in the vehicle.

Recently, instead of inserting a credit card into an ETCS terminal, a card integrated circuit (IC) chip is embedded in the ETCS terminal and card information issued by a card company is input into the card IC chip, thereby preventing structural restrictions or theft risk that may be caused when using a physical credit card.

SUMMARY

The disclosure relates to an electronic toll collection system (ETCS) terminal, and a control method thereof.

An embodiment of the disclosure provides an electronic toll collection system (ETCS) terminal with a built-in card integrated circuit (IC) chip storing issued card information. The ETCS terminal and a control method thereof may allow payment to be made, even when approaching a tollgate during an event such as new card issuance or card switch, by generating initialization inter-sector electronic purse (IEP) data of each card stored in the card IC chip in advance.

Additional embodiments of the disclosure will be set forth in part in the description which follows and, in part, may be obvious from the description, or may be learned by practice of the disclosure.

According to an embodiment of the disclosure, an electronic toll collection system (ETCS) terminal includes a communication interface configured to be connected to a vehicle network of a vehicle. An embodiment further includes a card integrated circuit (IC) chip configured to store a first card issued, and a controller configured to control the communication interface and the card IC chip. The controller may be configured to generate initialization inter-sector electronic purse (IEP) data of the first card. The controller may be configured to, in response to the vehicle approaching a tollgate in a state where new issuance of a second card is requested, control the communication interface to transmit the initialization IEP data of the first card to a roadside equipment (RSE) of the tollgate. And the controller may be configured to control the communication interface to perform billing communication with the RSE using the first card, and in response to the vehicle passing the tollgate, control the communication interface to switch to the state where new issuance of the second card is requested.

The initialization IEP data of the first card may include a transaction serial number of the first card, a random number generated by the first card, an identifier (ID) of an issuer of the first card, an ID of the first card, a balance of the first card, an ID of a transportation operator, an ID of a card service, a signature value generated by the first card, or any combination thereof, for example.

The controller may be configured to generate a session key by encrypting the transaction serial number of the first card, the random number generated by the first card, a key stored in the first card, or any combination thereof, for example.

The controller may be configured to generate a signature value by encrypting the ID of the issuer of the first card, the ID of the first card, the balance of the first card, the session key, or any combination thereof, for example.

In response to the vehicle approaching the tollgate after the initialization IEP data of the first card is generated and stored before starting installation of the second card, the controller may be configured to transmit the previously generated initialization IEP data of the first card to the RSE.

The controller may be configured to simultaneously control the communication interface to transmit the initialization IEP data of the first card to the RSE, stop installation of the second card, and switch a card for performing billing communication from the second card to the first card by selecting the first card as an instance.

The controller may be configured to update the initialization IEP data of the first card, in response to the billing communication with the RSE being completed.

The controller may be configured to control the card IC chip to restart installation of the second card, after completely passing the tollgate during the installation of the second card.

The controller may be configured to control the communication interface to transmit initialization IEP data of a third card stored in the card IC chip to the RSE, in response to the vehicle approaching the tollgate in a state where a switch from the first card to the third card is requested.

The controller may be configured to control the communication interface to transmit the initialization IEP data of the third card to the RSE, and then switch a card for performing billing communication to the third card from the first card by selecting the third card as an instance, and control the communication interface to perform billing communication with the RSE using the third card.

According to an embodiment of the disclosure, a control method of an ETCS terminal includes connecting a communication interface to a vehicle network of a vehicle and storing, on a card IC chip, a first card issued. The control method may include generating initialization IEP data of the first card. The control method may further include controlling the card IC chip to start installation of a second card based on a new issuance request for the second card, and in response to the vehicle approaching a tollgate before completing the installation of the second card, controlling the communication interface to transmit the initialization IEP data of the first card to an RSE of the tollgate. The control method may further include controlling the communication interface to perform billing communication with the RSE using the first card, after controlling the card IC chip to stop the installation of the second card.

The initialization IEP data of the first card may include a transaction serial number of the first card, a random number generated by the first card, an ID of an issuer of the first card, an ID of the first card, a balance of the first card, an ID of a transportation operator, an ID of a card service, a signature value generated by the first card, or any combination thereof.

The generating of the initialization IEP data of the first card may include generating a session key by encrypting the transaction serial number of the first card, the random number generated by the first card, a key stored in the first card or any combination thereof.

The generating of the initialization IEP data of the first card may include generating a signature value by encrypting the ID of the issuer of the first card, the ID of the first card, the balance of the first card, the session key, or any combination thereof.

The generating of the initialization IEP data of the first card may include generating the initialization IEP data of the first card, before the vehicle approaches the tollgate.

The controlling of the communication interface to perform billing communication with the RSE using the first card may include switching a card for performing billing communication to the first card from the second card by selecting the first card as an instance, after controlling the communication interface to transmit the initialization IEP data of the first card to the RSE.

The control method may further include updating the initialization IEP data of the first card, in response to the billing communication with the RSE being completed.

The control method may further include controlling the card IC chip to restart the installation of the second card, in response to the billing communication with the RSE being completed.

The control method may further include controlling the communication interface to transmit initialization IEP data of a third card stored in the card IC chip to the RSE, in response to the vehicle approaching the tollgate in a state where a switch from the first card to the third card is requested.

The control method may further include switching a card for performing billing communication to the third card from the first card by selecting the third card as an instance, after controlling the communication interface to transmit the initialization IEP data of the third card to the RSE. The control method may further include controlling the communication interface to perform billing communication with the RSE using the third card.

BRIEF DESCRIPTION OF THE DRAWINGS

These and/or other embodiments of the disclosure may become apparent and more readily appreciated from the following description of the embodiments, taken in conjunction with the accompanying drawings of which.

DETAILED DESCRIPTION OF ILLUSTRATIVE EMBODIMENTS

Like reference numerals throughout the specification denote like elements. Also, this specification does not describe all the elements according to embodiments of the disclosure, and descriptions well-known in the art to which the disclosure pertains or overlapped portions may be omitted.

It will be understood that when an element is referred to as being "connected" to another element, it may be directly or indirectly connected to the other element, wherein the indirect connection may include "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It may be to be understood that the singular forms may be intended to include the plural forms as well, unless the context clearly dictates otherwise.

The terms such as "~part," "~device," "~member," "~module," "~block," and the like may refer to a unit for processing at least one function or act. For example, the terms may refer to at least process processed by at least one hardware, such as field-programmable gate array (FPGA)/application specific integrated circuit (ASIC), software stored in memories or processors.

Reference numerals used for method steps may be just used for convenience of explanation, but not to limit an order of the steps. Thus, unless the context clearly dictates otherwise, the written order may be practiced otherwise.

Hereinafter, an electronic toll collection system (ETCS) terminal and a control method thereof according to embodiments of the disclosure will be described in detail with reference to the accompanying drawings.

Figure 1:
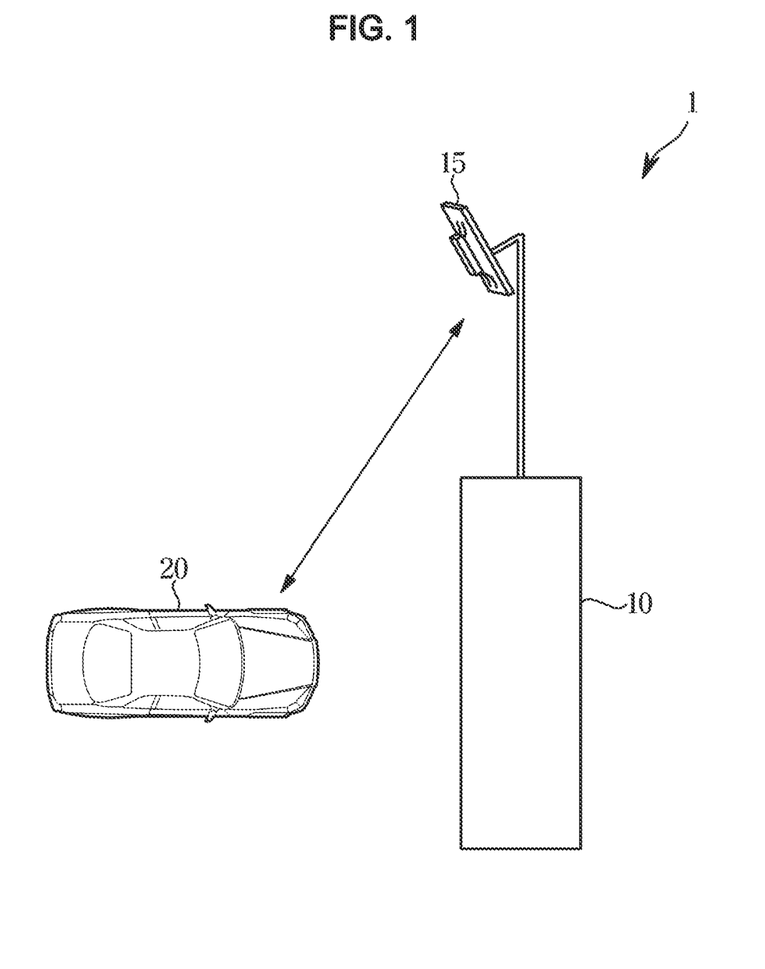
FIG. 1 illustrates an electronic toll collection system (ETCS) terminal according to an embodiment.

FIG. 1 illustrates an electronic toll collection system (ETCS) terminal according to an embodiment.

Referring to FIG. 1, an ETCS 1 according to an embodiment includes a tollgate 10 and a vehicle 20 capable of passing the tollgate 10, and a roadside equipment (RSE) 15 provided at the tollgate 10.

In an embodiment, the RSE 15 and an ETCS terminal of the vehicle 20 may automatically settle tolls by using a standardized application interface of the Dedicated Short-Range Communication protocols.

That is, the ETCS 1 may be a system capable of automatically transmitting and receiving toll information between the RSE 15 and a terminal of the vehicle 20 (on-board equipment (OBE) or ETCS terminal), based on Dedicated Short-Range Communications.

For toll transaction processing of the ETCS 1, when the vehicle 20 approaches the tollgate 10, a class of vehicle may be recognized by a vehicle classification device and information may be transmitted through a transmission and reception antenna by linking to a terminal installed in the vehicle 20.

Instead of inserting a credit card into an ETCS terminal, a card integrated circuit (IC) chip may be embedded in the ETCS terminal and card information issued by a card company may be input into the card IC chip, thereby preventing structural restrictions or theft risk that may be caused when using a physical credit card.

Hereinafter, an ETCS terminal of the vehicle 20 is described in detail.

Figure 2:
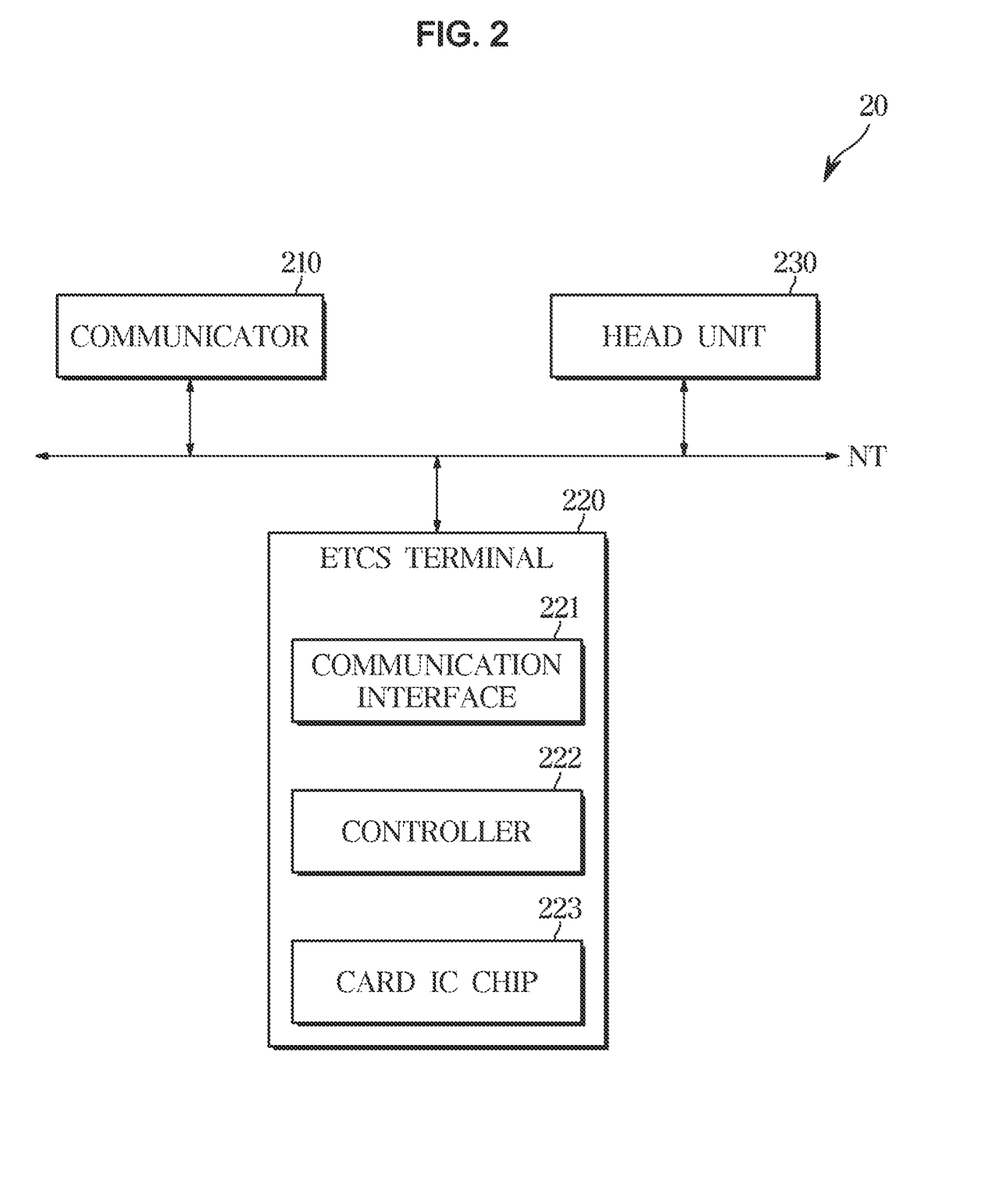
FIG. 2 is a control block diagram illustrating a vehicle according to an embodiment.

FIG. 2 is a control block diagram illustrating the vehicle 20 according to an embodiment.

Referring to FIG. 2, the vehicle 20 according to an embodiment may include a communicator 210 configured to communicate with an external electronic device. The vehicle 20 may include an ETCS terminal 220. The ETCS terminal 220 may include a card IC chip 223. And, the vehicle 20 may include a head unit 230 configured to receive a new card issuance request or a card switch request in the ETCS terminal 220 from a user.

Each of the communicator 210, the ETCS terminal 220, and the head unit 230 may be connected to a vehicle network (NT) and may transmit and receive data with each other.

According to an embodiment, the communicator 210 may perform communication with an external electronic device (e.g. the RSE 15, a server, etc.) via wireless communication. The communicator 210 may be a known type of wireless communication module.

According to an embodiment, the ETCS terminal 220 may include a communication interface 221 connected to the vehicle network (NT) to perform communication. The ETCS terminal 220 may include a controller 222 for controlling card issuance and card deletion. The ETCS terminal 220 may include a card IC chip 223 in which card information of an issued card may be input and which may perform payment.

According to an embodiment, the communication interface 221 may be connected to the vehicle network (NT) to perform communication. The communication interface 221 may be provided as a known type of communication module.

According to an embodiment, when a new card issuance command including a security key and card information is received through the head unit 230, the controller 222 may issue a new card to the card IC chip 223 using the security key. Specifically, the controller 222 may generate a supplementary security domain (SSD) and an applet corresponding to the card information in the card IC chip 223 using the security key, thereby issuing the new card.

According to an embodiment, when receiving a card deletion command including an authorization key from the head unit 230 through the communication interface 221, the controller 222 may delete the card issued to the card IC chip using the authorization key. In an embodiment, deleting the card issued to the card IC chip may be deleting an applet and a secure software download (SSD) corresponding to the card.

According to an embodiment, the controller 222 may generate initialization inter-sector electronic purse (IEP) data of a first card issued to the card IC chip 223.

In an embodiment, the first card issued to the card IC chip 223 is not a physical card, but in a form of card whose card information may be stored in the card IC chip 223. As such, the ETCS terminal 220 according to an embodiment may use an embedded HI-PASS card to prevent a user from arbitrarily relocating the card.

Accordingly, the ETCS terminal 220 may generate and store initialization IEP data to be transmitted when approaching the tollgate 10, in advance. The ETCS terminal 220 may perform in advance initialization IEP data generation and storage operations such as determining whether a card may be normally installed, determining whether a HI-PASS card may be present, confirming a registered card, reading card information, and the like, which are conventionally required to be performed in a structure where a physical card is required to be inserted into a card socket. In other words, not a physical card inserted into a card socket, as the card IC chip 223-embedded card storing the card information, the first card issued to the card IC chip 223 of the ETCS terminal 220 may be guaranteed as being an identical card, when paying at the tollgate 10.

The controller 222 may generate the initialization IEP data of the first card before the vehicle 20 approaches the tollgate 10.

In an embodiment, the initialization IEP data of the first card may include a transaction serial number of the first card, a random number generated by the first card, an identifier (ID) of an issuer of the first card, an ID of the first card, a balance of the first card, an ID of a transportation operator, an ID of a card service, a signature value generated by the first card, or any combination thereof.

In particular, the controller 222 may generate a session key by encrypting the transaction serial number of the first card, the random number generated by the first card, and a key stored in the first card, for example.

Also, the controller 222 may generate a signature value by encrypting the ID of the issuer of the first card, the ID of the first card, the balance of the first card, the session key, or any combination thereof.

According to an embodiment, after controlling the card IC chip 223 to start installation of a second card based on a new issuance request for the second card, when the vehicle 20 approaches the tollgate 10, the controller 222 may control the communication interface 221 to transmit the initialization IEP data of the first card to the RSE 15 of the tollgate 10.

When payment is required because the vehicle 20 approaches the tollgate 10 while issuing a new card according to the new card issuance request, the controller 222 may control the communication interface 221 to first transmit the previously stored initialization IEP data of the already issued card (the first card) to the RSE 15.

Afterwards, when passing the tollgate in a state where issuance of a new card (the second card) is requested, the controller 222 may switch to the state where issuance of the second card is requested.

When the vehicle approaches the tollgate during the installation of the second card, the controller 222 may control the card IC chip 223 to stop the installation of the second card, and then control the communication interface 221 to perform billing communication with the RSE 15 using the first card. Specifically, after controlling the communication interface 221 to transmit the initialization IEP data of the first card to the RSE 15, the controller 222 may switch a card for performing billing communication from the second card to the first card by selecting the first card as an instance.

According to an embodiment, the controller 222 may update the initialization IEP data of the first card, when the billing communication with the RSE 15 is completed.

According to an embodiment, the controller 222 may also control the card IC chip 223 to restart the installation of the second card, when the billing communication with the RSE 15 is completed.

In addition, the controller 222 may delete the first card and/or the second card issued to the card IC chip 223 according to a user's request. According to an embodiment, when the vehicle 20 approaches the tollgate 10 in a state where a switch from the first card to a third card stored in the card IC chip 223 is requested, the controller 222 may control the communication interface 221 to transmit initialization IEP data of the third card to the RSE 15.

Although a plurality of cards may be issued to the card IC chip 223 of the ETCS terminal 220 according to an embodiment, a single card may be selected as a card capable of performing billing communication, due to characteristics of billing communication based on a single communication interface. In an embodiment, a user may select a card to perform billing communication from the plurality of cards issued to the card IC chip 223, and also request a switch to another card from the selected card.

As described above, when approaching the tollgate 10 during card switch according to a request for switching a card for performing billing communication, the ETCS terminal 220 may first transmit initialization IEP data of a card to be switched to the RSE 15, thereby preventing a payment delay due to the card switch.

Specifically, after controlling the communication interface 221 to transmit the initialization IEP data of the third card to the RSE 15, the controller 222 may switch a card for performing billing communication to the third card from the first card by selecting the third card as an instance, and control the communication interface 221 to perform billing communication with the RSE 15 using the third card.

As such, even when passing the tollgate 10 during an operation of issuing/deleing another card or a card switch operation, the ETCS terminal 220 may first transmit previously stored initialization IEP data, and thereby normally perform the card switch and payment in a short period of time.

The controller 222 may include at least one memory storing a program for performing the aforementioned operations and operations described below, and at least one processor for implementing a stored program. When a plurality of memories and processors are provided, the plurality of memories and processors may be integrated into one chip, or provided in physically separated locations.

The card IC chip 223 according to an embodiment may perform payment based on card information of an issued card. That is, the card IC chip 223 may perform payment based on toll information received from the RSE 15.

The card IC chip 223 may include an issuer security domain (ISD) that may be initially permanently installed in the card IC chip 223 by an initial card issuer (e.g., a manufacturer of the vehicle 20) and an SSD that may be installed by a service provider (card company) providing a payment service and requires to manage a separate key. In an embodiment, deletion and change of the card information may be performed only by the ISD and a structure of a security domain (SD) including the ISD and the SSD may comply with a Global Platform (GP) card specification, for example.

According to an embodiment, the head unit 230 may control a connected car service (CCS). That is, the head unit 230 may store CCS subscription information and transmit and receive data with a server through the communicator 210 based on the CCS subscription information.

For example, the head unit 230 may receive a card issuance command or a card deletion command from the server through the communicator 210, and transmit the card issuance command or the card deletion command received from the server through the communicator 210 to the ETCS terminal 220.

Figure 3:
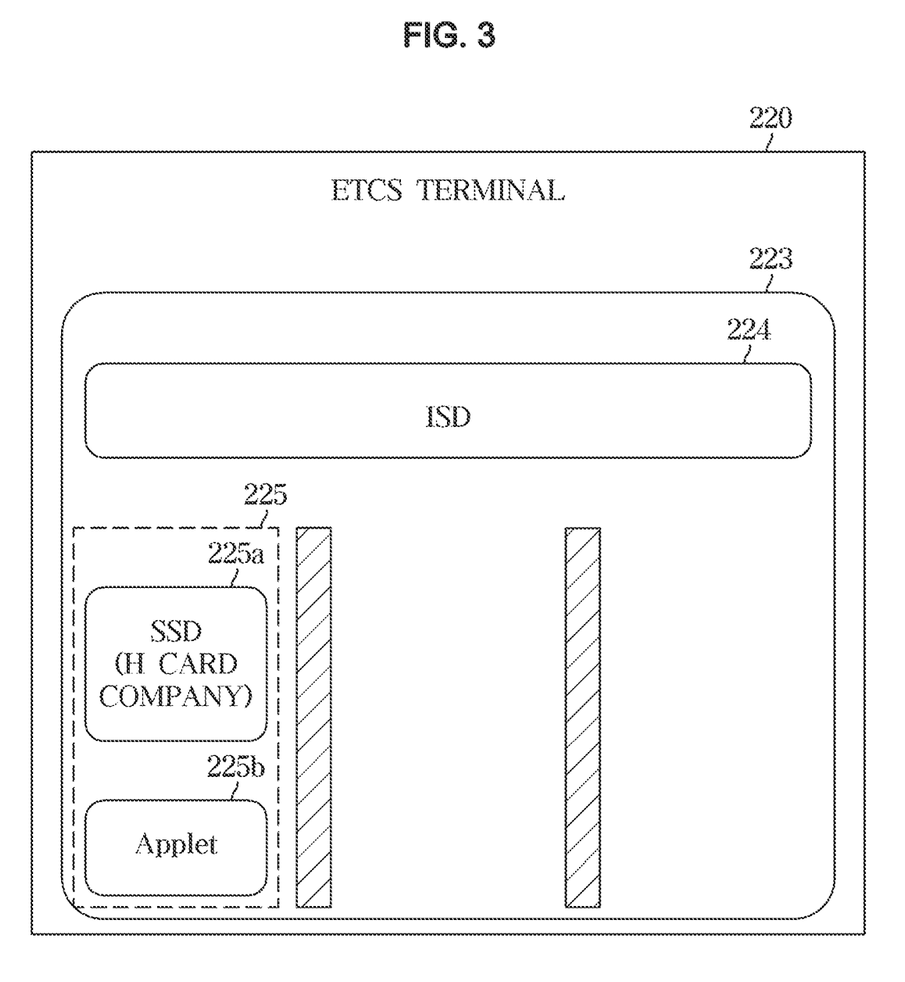
FIG. 3 is a diagram illustrating an example of issuing a card to a card IC chip of an ETCS terminal according to an embodiment.

FIG. 3 is a diagram illustrating an example of issuing a card to a card IC chip of an ETCS terminal according to an embodiment.

Referring to FIG. 3, according to an embodiment, when receiving a card issuance command from a server, the head unit 230 may transmit the card issuance command to the ETCS terminal 220, and the ETCS terminal 220 may issue a card by generating an SSD and applet in the card IC chip 223.

Specifically, as shown in FIG. 3, by generating an SSD 225a and an applet 225b corresponding to card information in the card IC chip 223 using a security key, the ETCS terminal 220 may issue a card 225. In an embodiment, generation of the SSD 225a and the applet 225b may be performed by an ISD 224.

In an embodiment, the security key corresponds to a key having an authority to issue a new card, and may be issued by a personal secure application module (PerSAM). The PerSAM may be a card-type security device that may be required to be used according to a specified procedure in order to securely deliver a key for issuing a card (electronic currency). The PerSAM may be a module having key information required for issuance, and may be provided by the Korea Expressway Corporation in charge of ETCS, for example.

Figure 4:
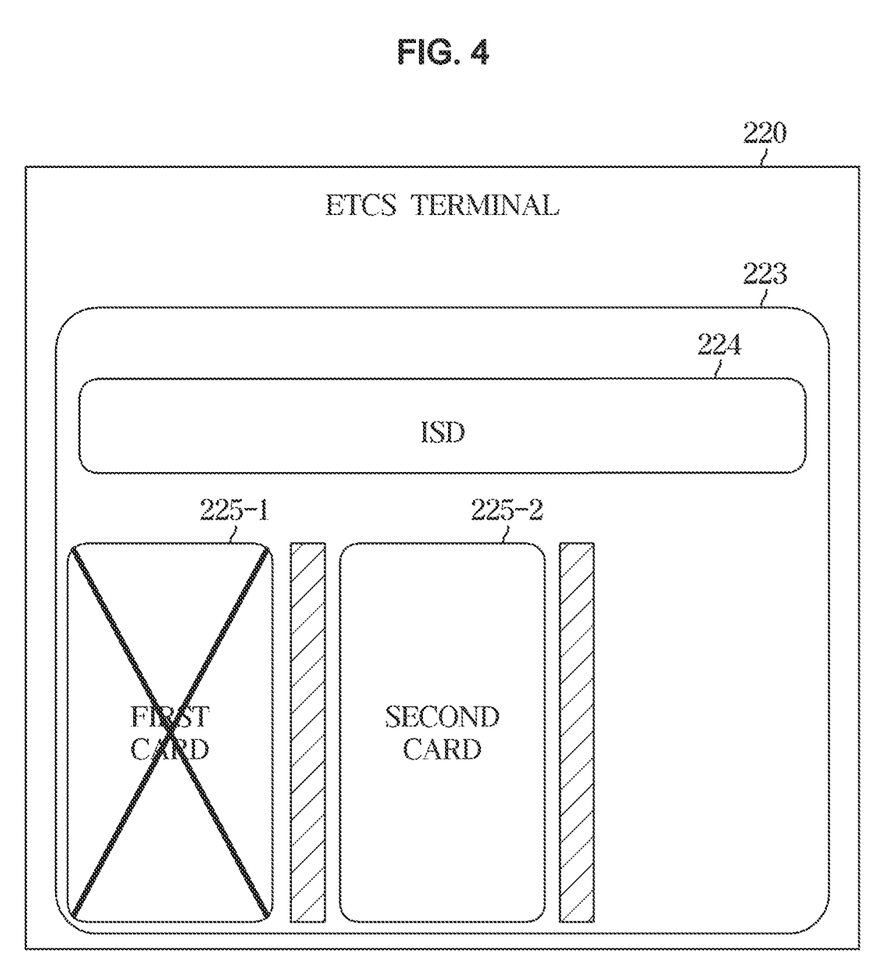
FIG. 4 is a diagram illustrating an example of issuing a new card in a state where a card has been issued to a card IC chip of an ETCS terminal according to an embodiment.
Figure 5:
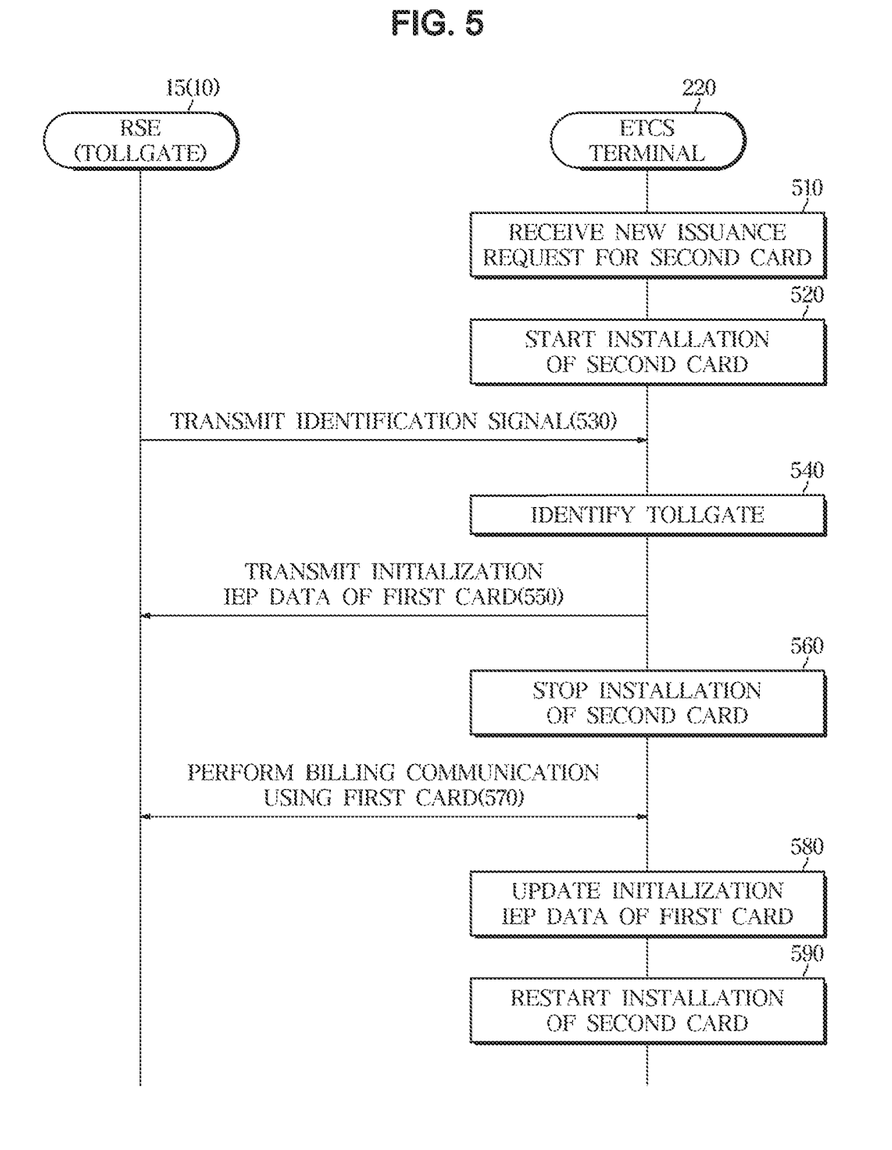
FIG. 5 is a signal flow graph when approaching a tollgate during new card issuance by an ETCS terminal according to an embodiment.

FIG. 4 is a diagram illustrating an example of issuing a new card in a state where a card has been issued to the card IC chip 223 of the ETCS terminal 220 according to an embodiment. FIG. 5 is a signal flow graph when approaching a tollgate during issuance of the new card 225 by the ETCS terminal 220 according to an embodiment.

Referring to FIG. 4, when receiving a new card issuance command including a security key and an authorization key from the head unit 230 through the communication interface 221, the ETCS terminal 220 may delete a first card 225-1 issued to the card IC chip 223 using the authorization key, and issue a second card 225-2 which is a new card to the card IC chip 223 using the security key. In an embodiment, deleting the first card 225-1 issued to the card IC chip 223 may be deleting an applet and an SSD corresponding to the first card 225-1.

In an embodiment, the authorization key corresponds to a key having an authority to delete a card and may be issued by the PerSAM. Also, a card deletion command may include an SSD deletion command and an applet deletion command.

For example, as shown in FIG. 5, when receiving a new issuance request for the second card 225-2 (action 510), the ETCS terminal 220 may start installation of the second card 225-2 (action 520).

In an embodiment, as the vehicle 20 approaches the tollgate 10, when the RSE 15 transmits an identification signal to the ETCS terminal 220 (action 530), the ETCS terminal 220 may identify the tollgate 10 (action 540), and transmit initialization IEP data of the first card 225-1 to the RSE 15 (action 550).

When payment is required because the vehicle 20 approaches the tollgate 10 while issuing the new card that is the second card 225-2 according to the new card issuance request, the ETCS terminal 220 may control the communication interface 221 to first transmit the previously stored initialization IEP data of the already issued card (the first card 225-1) to the RSE 15.

In an embodiment, the ETCS terminal 220 may generate the initialization IEP data of the first card 225-1 before the vehicle 20 approaches the tollgate 10.

The initialization IEP data of the first card 225-1 may include a transaction serial number of the first card 225-1, a random number generated by the first card 225-1, an ID of an issuer of the first card 225-1, an ID of the first card 225-1, a balance of the first card 225-1, an ID of a transportation operator, an ID of a card service, a signature value generated by the first card 225-1, or any combination thereof.

In particular, the ETCS terminal 220 may generate a session key by encrypting the transaction serial number of the first card 225-1, encrypting the random number generated by the first card 225-1, and encrypting a key stored in the first card 225-1.

Also, the ETCS terminal 220 may generate a signature value by encrypting the ID of the issuer of the first card 225-1, the ID of the first card 225-1, the balance of the first card 225-1, and the session key.

In an embodiment, the first card 225-1 issued to the card IC chip 223 is not a physical card, but in a form of card whose card information is stored in the card IC chip 223. As such, the ETCS terminal 220 according to an embodiment uses an embedded HI-PASS card, for example, to prevent a user from arbitrarily relocating the card.

Accordingly, the ETCS terminal 220 may generate and store initialization IEP data to be transmitted when approaching the tollgate 10, in advance. The ETCS terminal 220 may perform in advance initialization IEP data generation and storage operations such as determining whether a card is normally installed, determining whether a HI-PASS card is present, confirming a registered card, reading card information, and the like, which are steps conventionally required to be performed in a structure where a physical card is required to be inserted into a card socket. In other words, not a physical card inserted into a card socket, as the card IC chip 223-embedded card storing the card information, the first card 225-1 issued to the card IC chip 223 of the ETCS terminal 220 may be guaranteed as being an identical card, when paying at the tollgate 10.

Afterwards, according to an embodiment, the ETCS terminal 220 may stop the installation of the second card 225-2 (action 560), and perform billing communication with the RSE 15 using the first card 225-1 (action 570).

Specifically, after controlling the communication interface 221 to transmit the initialization IEP data of the first card 225-1 to the RSE 15, the ETCS terminal 220 may switch a card for performing billing communication from the second card 225-2 to the first card 225-1 by selecting the first card 225-1 as an instance.

According to an embodiment, when the billing communication with the RSE 15 is completed, the ETCS terminal 220 may update the initialization IEP data of the first card 225-1 (action 580). The ETCS terminal 220 may update the session key and the signature value by updating the transaction serial number of the first card 225-1 and the random number generated by the first card 225-1.

According to an embodiment, when the billing communication with the RSE 15 is completed, the ETCS terminal 220 may also restart the installation of the second card 225-2 (action 590).

Even when passing the tollgate 10 during an operation of issuing another card, the ETCS terminal 220 may first transmit previously stored initialization IEP data, thereby normally perform payment and card issuance in a short period of time.

Figure 6:
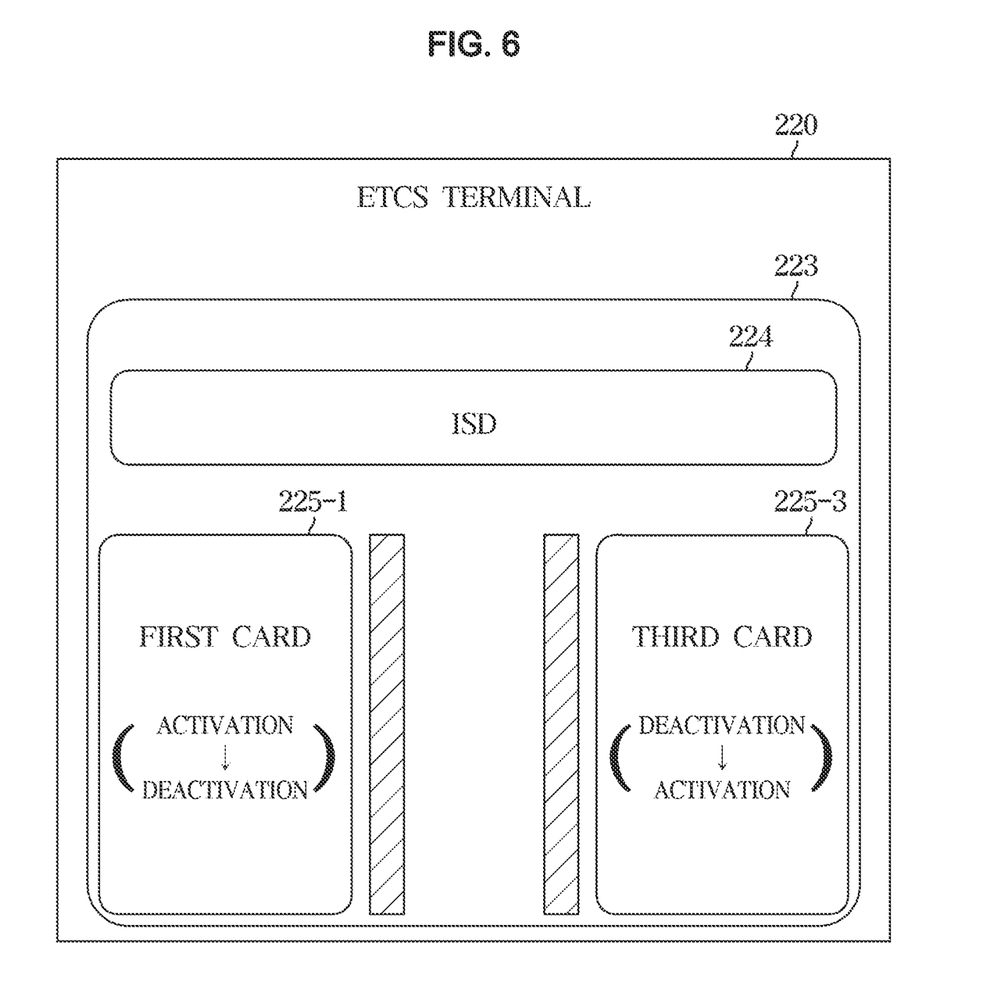
FIG. 6 is a diagram illustrating an example where an ETCS terminal switches a card for performing billing communication according to an embodiment.
Figure 7:
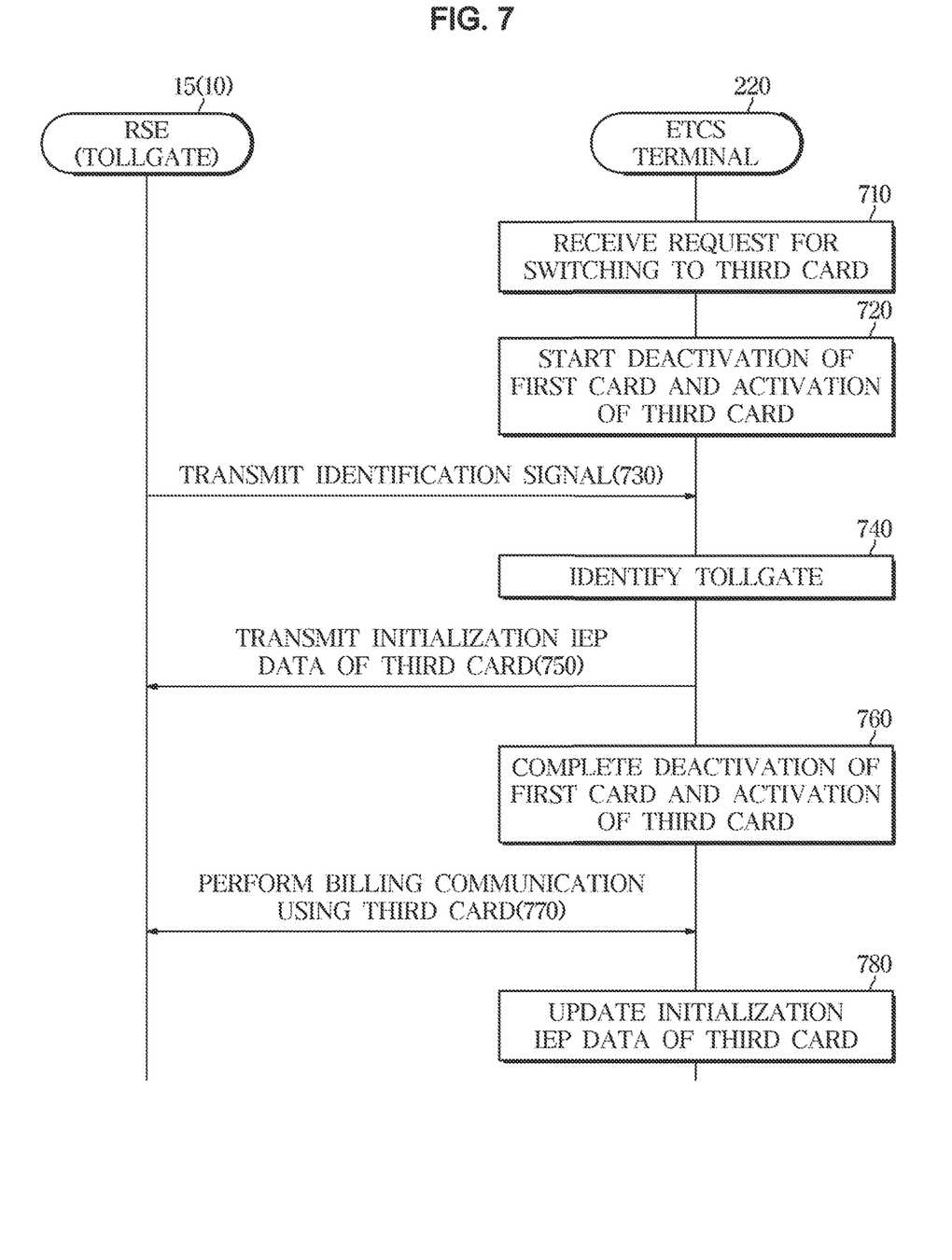
FIG. 7 is a signal flow graph when approaching a tollgate during card switch by an ETCS terminal according to an embodiment.

FIG. 6 is a diagram illustrating an example according to an embodiment where the ETCS terminal 220 switches the card 225 performing billing communication. FIG. 7 is a signal flow graph when approaching the tollgate 10 during card switch by the ETCS terminal 220, according to an embodiment.

Referring to FIG. 6, a plurality of cards may be issued to the card IC chip 223 of the ETCS terminal 220 according to an embodiment, but a single card may be selected as a card capable of performing billing communication due to characteristics of billing communication based on a single communication interface. In an embodiment, a user may select a card to perform billing communication from the plurality of cards issued to the card IC chip 223, and also request a switch to another card from the selected card.

For example, as shown in FIG. 6, the ETCS terminal 220 may use the first card 225-1 as a card for performing billing communication, and receive a request for switching a card for performing billing communication to a third card 225-3.

That is, the ETCS terminal 220 may receive the request for switching to the third card 225-3 (action 710), and start deactivation of the first card 225-1 and activation of the third card 225-3 (action 720).

In an embodiment, as the vehicle 20 approaches the tollgate 10, when the RSE 15 transmits an identification signal to the ETCS terminal 220 (action 730), the ETCS terminal 220 may identify the tollgate 10 (action 740), and transmit initialization IEP data of the third card 225-3 to the RSE 15 (action 750).

Afterwards, the ETCS terminal 220 may complete the deactivation of the first card 225-1 and the activation of the third card 225-3 (action 760), and perform billing communication using the third card 225-3 (action 770).

As described above, when approaching the tollgate 10 during card switch according to a request for switching a card for performing billing communication, the ETCS terminal 220 may first transmit initialization IEP data of a card to be switched to the RSE 15, thereby preventing a payment delay due to the card switch.

Specifically, after controlling the communication interface 221 to transmit the initialization IEP data of the third card 225-3 to the RSE 15, the ETCS terminal 220 may switch a card for performing billing communication to the third card 225-3 from the first card 225-1 by selecting the third card 225-3 as an instance, and control the communication interface 221 to perform billing communication with the RSE 15 using the third card 225-3.

According to an embodiment, when the billing communication with the RSE 15 is completed, the ETCS terminal 220 may update the initialization IEP data of the third card 225-3 (action 780). The ETCS terminal 220 may update a session key and a signature value by updating a transaction serial number of the third card 225-3 and a random number generated by the third card 225-3.

As such, even when passing the tollgate 10 during a card switch operation, the ETCS terminal 220 may first transmit previously stored initialization IEP data, and thereby normally perform the card switch and payment in a short period of time.

Hereinafter, embodiments of a control method of the ETCS terminal 220 are described. The above-described ETCS terminal 220 may be used in the control method of the ETCS terminal 220. Accordingly, the description made with reference to FIGS. 1 to 7 may be applicable to the control method of the ETCS terminal 220.

Figure 8:
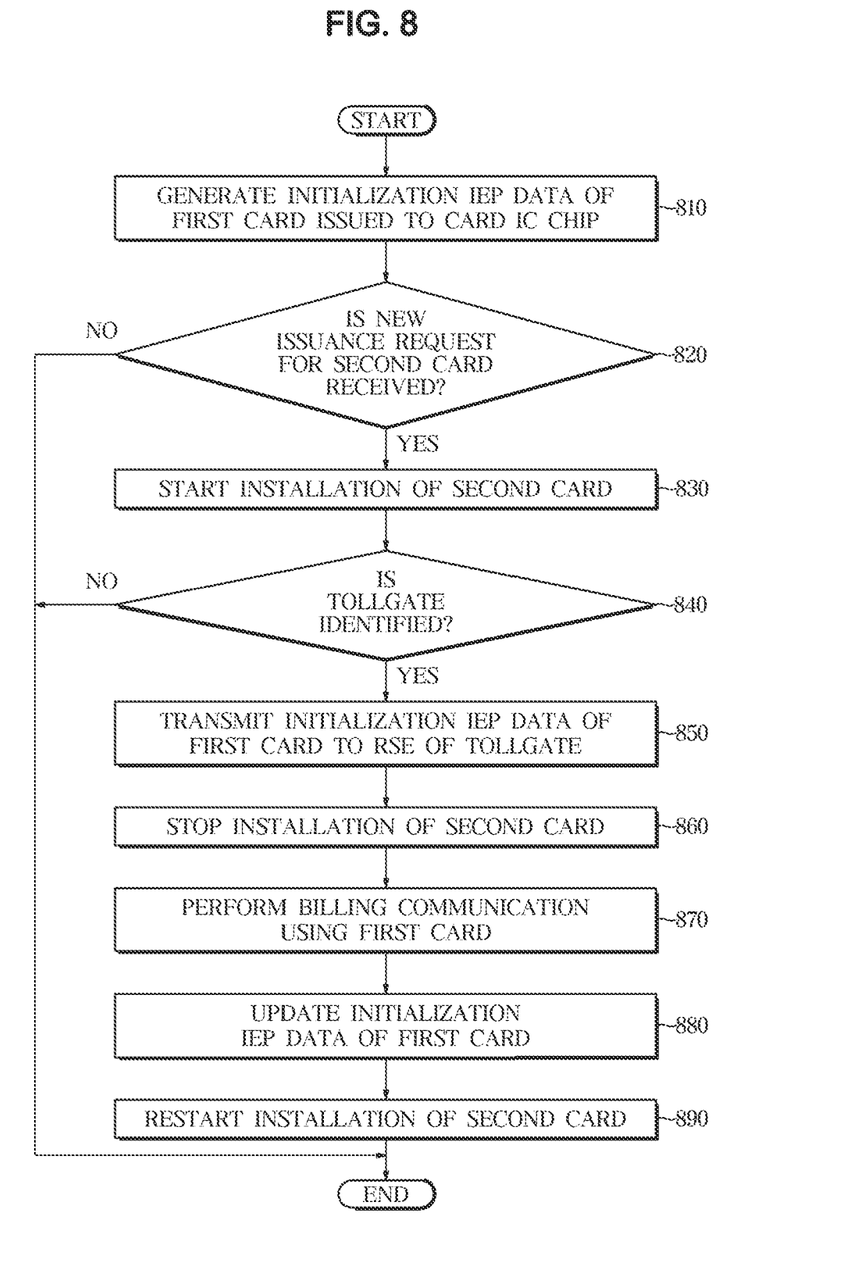
FIG. 8 is a flowchart illustrating operations performed when approaching a tollgate during new card issuance in a control method of an ETCS terminal according to an embodiment.

FIG. 8 is a flowchart illustrating operations performed when approaching the tollgate 10 during issuance of the new card 225 in a control method of the ETCS terminal 220 according to an embodiment.

Referring to FIG. 8, the ETCS terminal 220 according to an embodiment may generate initialization IEP data of the first card 225-1 issued to the card IC chip 223 (action 810).

In an embodiment, the initialization IEP data of the first card 225-1 may include a transaction serial number of the first card 225-1, a random number generated by the first card 225-1, an ID of an issuer of the first card 225-1, an ID of the first card 225-1, a balance of the first card 225-1, an ID of a transportation operator, an ID of a card service, and a signature value generated by the first card 225-1.

In particular, the ETCS terminal 220 may generate a session key by encrypting the transaction serial number of the first card 225-1, the random number generated by the first card 225-1, and a key stored in the first card 225-1.

Also, the ETCS terminal 220 may generate a signature value by encrypting the ID of the issuer of the first card 225-1, the ID of the first card 225-1, the balance of the first card 225-1, and the session key.

When receiving a new issuance request for the second card 225-2 (Yes in operation 820), the ETCS terminal 220 may start installation of the second card 225-2 (action 830).

After controlling the card IC chip 223 to start installation of the second card 225-2 based on the new issuance request for the second card 225-2, when the ETCS terminal 220 identifies the tollgate 10 as the vehicle 20 approaches the tollgate 10 (Yes in operation 840), the ETCS terminal 220 may transmit the initialization IEP data of the first card 225-1 to the RSE 15 of the tollgate 10 (action 850).

When approaching the tollgate after generating and storing the initialization IEP data of the first card before starting the installation of the second card, the ETCS terminal 220 may transmit the previously generated initialization IEP data of the first card to the RSE.

When passing the tollgate during the installation of the second card, the previously stored initialization IEP data of the first card may be transmitted to the RSE, and at the same time a switch from the second card to the first card may be performed.

In an embodiment, a command for the card switch may be transmitted through an ISO7816 card interface and the transmission of initialization IEP data may be performed by a communication modem, and thus both switch and transmission may be simultaneously performed.

The ETCS terminal 220 may simultaneously control the communication interface to transmit the initialization IEP data of the first card to the RSE, stop the installation of the second card, and switch a card for performing billing communication from the second card to the first card by selecting the first card as an instance.

That is, the ETCS terminal 220 may stop the installation of the second card 225-2 (action 860), and perform billing communication using the first card 225-1 (action 870).

Afterwards, the ETCS terminal 220 may update the initialization IEP data of the first card 225-1 (action 880), and restart the installation of the second card 225-2 (action 890).

As described above, even when passing the tollgate 10 during an operation of issuing another card, the ETCS terminal 220 may first transmit previously stored initialization IEP data, thereby normally perform payment and card issuance/deletion in a short period of time.

Figure 9:
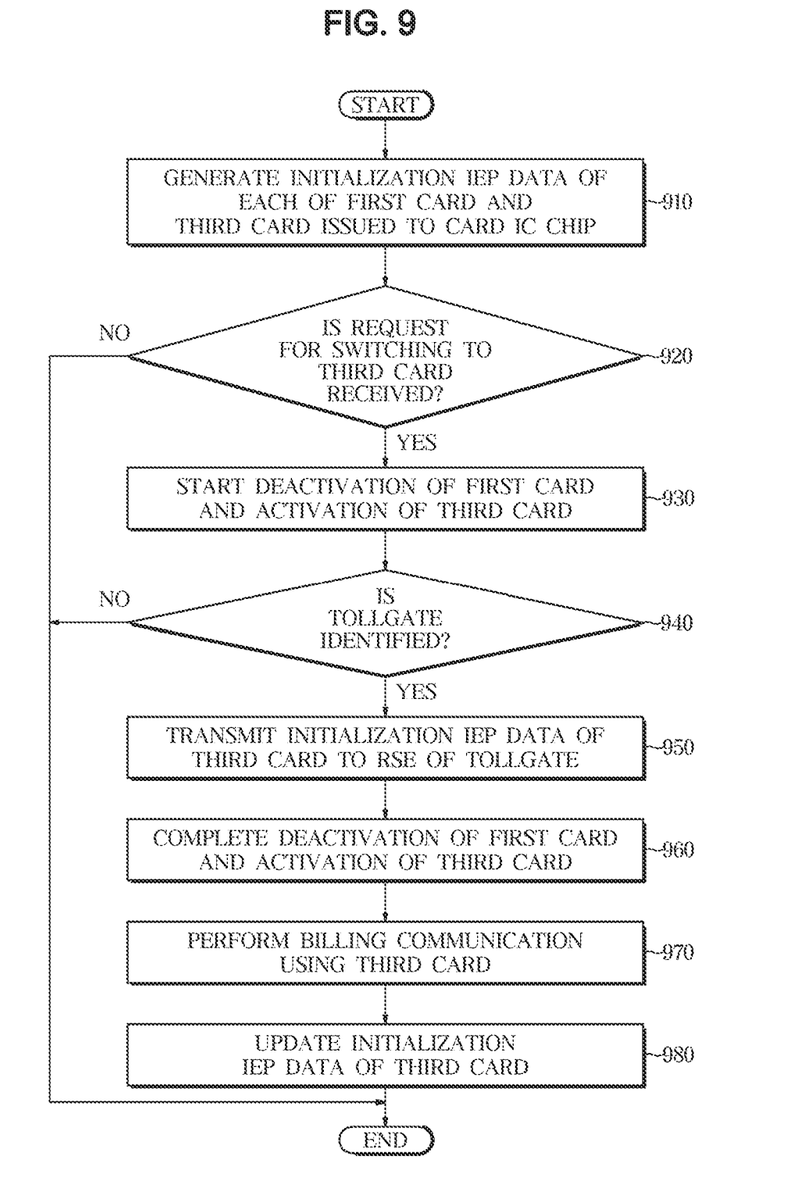
FIG. 9 is a flowchart illustrating operations performed when approaching a tollgate during card switch in a control method of an ETCS terminal according to an embodiment.

FIG. 9 is a flowchart illustrating operations performed when approaching the tollgate 10 during card switch in a control method of the ETCS terminal 220 according to an embodiment.

Referring to FIG. 9, the ETCS terminal 220 according to an embodiment may generate initialization IEP data of each of the first card 225-1 and the third card 225-3 issued to the card IC chip 223 (action 910).

According to an embodiment, when receiving a request for switching to the third card 225-3 (Yes in operation 920), the ETCS terminal 220 may start deactivation of the first card 225-1 and activation of the third card 225-3 (action 930).

According to an embodiment, when approaching and identifying the tollgate 10 while a card switch is performed according to the request for switching a card for performing billing communication (Yes in operation 940), the ETCS terminal 220 may transmit the initialization IEP data of the third card 225-3 to the RSE 15 of the tollgate 10 (action 950), thereby preventing a payment delay due to the card switch.

Afterwards, the ETCS terminal 220 may complete the deactivation of the first card 225-1 and the activation of the third card 225-3 (action 960), and perform billing communication using the third card 225-3 (action 970).

Specifically, after controlling the communication interface 221 to transmit the initialization IEP data of the third card 225-3 to the RSE 15, the ETCS terminal 220 may switch a card for performing billing communication to the third card 225-3 from the first card 225-1 by selecting the third card 225-3 as an instance, and control the communication interface 221 to perform billing communication with the RSE 15 using the third card 225-3.

According to an embodiment, when the billing communication with the RSE 15 is completed, the ETCS terminal 220 may update the initialization IEP data of the third card 225-3 (action 980). The ETCS terminal 220 may update a session key and a signature value by updating a transaction serial number of the third card 225-3 and a random number generated by the third card 225-3.

As described above, even when passing the tollgate 10 during a card switch operation, the ETCS terminal 220 can first transmit previously stored initialization IEP data, thereby normally perform payment and card switch in a short period of time.

As can be apparent from the above, according to the embodiments of the disclosure, the ETCS terminal and the control method thereof can allow payment to be made, even when approaching a tollgate during an event such as new card issuance or card switch, by generating initialization IEP data of each card stored in the card IC chip in advance.

Embodiments may thus be implemented in the form of a recording medium storing computer-executable instructions that are executable by at least one processor. The instructions may be stored in the form of a program code, and when executed by a processor, the instructions may generate a program module to perform operations of the disclosed embodiments. The recording medium may be implemented non-transitory as a computer-readable recording medium.

The computer-readable code may be recorded on a medium or transmitted through the Internet. The medium may include read only memory (ROM), random access memory (RAM), magnetic tapes, magnetic disks, flash memories, optical recording medium, or any combination thereof, for example.

Although embodiments have been described for illustrative purposes, those skilled in the art will appreciate that various modifications, additions, and substitutions can be possible, without departing from the scope and spirit of the disclosure. Therefore, embodiments have not been described for limiting purposes.

What is claimed is:

1. An electronic toll collection system (ETCS) terminal comprising:
   a communication interface configured to connect a vehicle to a network;
   a card integrated circuit (IC) chip configured to store a first card; and
   a controller configured to control the communication interface and the card IC chip, wherein the controller is configured to:
      identify a tollgate by receiving an identification signal from a roadside equipment (RSE) of the tollgate;
      control the communication interface to transmit initialization inter-sector electronic purse (IEP) data generated based on the first card;
      control the card IC chip to stop installation of a second card based on a received new issuance request for the installation of the second card and based on the identification signal;
      control the communication interface to perform billing communication with the RSE by transmitting first card information of the first card;
      complete the billing communication with the RSE based on passing the tollgate; and
      control the card IC chip to restart the installation of the second card.

2. The terminal of claim 1, wherein the initialization IEP data of the first card includes a transaction serial number of the first card, a random number generated by the first card, an identifier (ID) of an issuer of the first card, an ID of the first card, a balance of the first card, an ID of a transportation operator, an ID of a card service, and a signature value generated by the first card.

3. The terminal of claim 2, wherein the controller is configured to generate a session key by encrypting the transaction serial number of the first card, the random number generated by the first card, and a key stored in the first card.

4. The terminal of claim 3, wherein the controller is configured to generate a signature value by encrypting the ID of the issuer of the first card, the ID of the first card, the balance of the first card, and the session key.

5. The terminal of claim 1, wherein, the controller is configured to, in response to the vehicle approaching the tollgate, transmit the previously generated initialization IEP data of the first card to the RSE before starting the installation of the second card.

6. The terminal of claim 1, wherein the controller is configured to:
   simultaneously control the communication interface to transmit the previously generated initialization IEP data of the first card to the RSE,
   control the card IC to stop the installation of the second card, and
   switch from the second card to the first card for performing the billing communication by selecting the first card.

7. The terminal of claim 1, wherein the controller is configured to update the initialization IEP data of the first card in response to the billing communication with the RSE being completed.

8. The terminal of claim 1, wherein the controller is configured to control the card IC chip to restart the installation of the second card, based on passing the tollgate.

9. The terminal of claim 1, wherein the controller is configured to control the communication interface to transmit initialization IEP data of a third card stored in the card IC chip to the RSE based on a received switching request from the first card to the third card and when the vehicle approaches the tollgate.

10. The terminal of claim 9, wherein the controller is configured to:
    control the communication interface to transmit the initialization IEP data of the third card to the RSE,
    then switch from the first card to the third card for performing the billing communication, and
    control the communication interface to perform the billing communication with the RSE using the third card.

11. A control method of an electronic toll collection system (ETCS) terminal comprising a communication interface for connecting a vehicle to a network and a card integrated circuit (IC) chip for storing a first card, the control method comprising:
    identifying a tollgate by receiving an identification signal from a roadside equipment (RSE) of the tollgate;
    controlling the communication interface to transmit initialization inter-sector electronic purse (IEP) data generated based on the first card to the RSE of the tollgate;
    controlling the card IC chip to stop installation of a second card after receiving a new issuance request for installation of the second card and before completing the installation of the second card when the vehicle approaches the tollgate; and
    controlling the communication interface to perform billing communication with the RSE by transmitting first card information of the first card after stopping the installation of the second card.

12. The control method of claim 11, wherein the initialization IEP data of the first card includes a transaction serial number of the first card, a random number generated by the first card, an identifier (ID) of an issuer of the first card, an ID of the first card, a balance of the first card, an ID of a transportation operator, an ID of a card service, and a signature value generated by the first card.

13. The control method of claim 12, wherein generating the initialization IEP data of the first card comprises generating a session key by encrypting the transaction serial number of the first card, the random number generated by the first card, and a key stored in the first card.

14. The control method of claim 13, wherein generating the initialization IEP data of the first card comprises generating a signature value by encrypting the ID of the issuer of the first card, the ID of the first card, the balance of the first card, and the session key.

15. The control method of claim 11, wherein generating the initialization IEP data of the first card comprises generating the initialization IEP data of the first card before the vehicle approaches the tollgate.

16. The control method of claim 11, wherein controlling the communication interface to perform the billing communication with the RSE comprises switching from the second card to the first card for performing the billing communication after controlling the communication interface to transmit the initialization IEP data of the first card to the RSE.

17. The control method of claim 11, further comprising updating the initialization IEP data of the first card in response to the billing communication with the RSE being completed.

18. The control method of claim 11, further comprising controlling the card IC chip to restart the installation of the second card, in response to the billing communication with the RSE being completed.

19. The control method of claim 11, further comprising controlling the communication interface to transmit initialization IEP data of a third card stored in the card IC chip to the RSE based on a received switching request from the first card to the third card and when the vehicle approaches the tollgate.

20. The control method of claim 19, further comprising:
   switching from the first card to the third card for performing the billing communication after controlling the communication interface to transmit the initialization IEP data of the third card to the RSE; and
   controlling the communication interface to perform the billing communication with the RSE using the third card.

* * * * *